Figure 1:
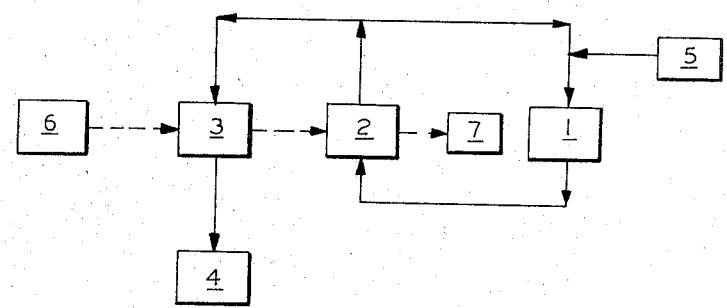

INVENTORS
YOSHIKAZU ITO
FUMIO NISHIKAWA
TAKAO IWAMURA

BY Nathaniel L. Leek

ATTORNEY

United States Patent Office 3,338,887
Patented Aug. 29, 1967

3,338,887
PREPARATION OF NITROSYL CHLORIDE
Yoshikazu Ito, Mizuho-ku, Nagoya, and Fumio Nishikawa and Takao Iwamura, Minami-ku, Nagoya, Japan, assignors to Toyo Rayon Kabushiki Kaisha, Tokyo, Japan, a corporation of Japan
Filed Dec. 26, 1962, Ser. No. 246,914
Claims priority, application Japan, Dec. 26, 1961, 36/46,743
1 Claim. (Cl. 260—239.3)

This invention relates to a method of preparing nitrosyl chloride which makes it possible to prepare nitrosyl chloride cyclically with advantage and effectiveness on a commercial scale, and in which the liquid portion which increases concomitantly as the reaction proceeds can be directly utilized as the acid catalyst in the Beckmann rearrangement of the hydrochloride salts of cycloalkanone oximes obtained by the photochemical reaction of cycloalkanes. More particularly, the invention relates to a method of preparing nitrosyl chloride which comprises reacting a mixed gas comprising nitrogen monoxide and nitrogen peroxide with sulfuric acid to obtain a sulfuric acid solution of nitrosylsulfuric acid, reacting said sulfuric acid solution with a primary hydrogen chloride gas to generate primarily nitrosyl chloride, reacting a mixed gas comprising nitrogen monoxide and nitrogen peroxide again with this spent liquor to set up a cyclic system for preparing nitrosyl chloride, taking out from the aforesaid spent liquor the liquid portion which increases concomitantly as the cyclic reaction proceeds, and then reacting this spent liquor with a secondary hydrogen chloride gas to generate secondarily nitrosyl chloride until the nitrosylsulfuric acid in the spent liquor is reduced to less than 3% by weight.

The spent liquor from which has been secondarily generated nitrosyl chloride after having been added, if necessary, sulfuric acid or fuming sulfuric acid or without such an addition can be directly utilized as the acid catalyst when effecting the Beckmann rearrangement of the hydrochloride salts of cycloalkanone oximes obtained by the photochemical reaction of cycloalkanes to the corresponding lactams of said cycloalkanes.

It is generally known to obtain nitrosyl chloride by obtaining a sulfuric acid solution of nitrosylsulfuric acid by causing a mixed gas comprising nitrogen monoxide and nitrogen peroxide, such as a "nitrose" gas, to be absorbed into sulfuric acid in accordance with the following Equation 1, and thereafter reacting as in Equation 2 by blowing in hydrogen chloride gas into this solution.

(1)   $N_2O_3 + 2H_2SO_4 \rightarrow 2HNOSO_4 + H_2O$ (2)   $HCl + HNOSO_4 \rightarrow H_2SO_4 + NOCl\uparrow$ However, this method of obtaining nitrosyl chloride from nitrosylsulfuric acid and hydrogen chloride gas had been practiced hitherto only on a laboratory scale.

In order to carry out a similar method on a commercial scale, we have previously proposed a method of obtaining nitrosyl chloride continuously by reacting the oxides of nitrogen with sulphuric acid to obtain a sulphuric acid solution of nitrosylsulphuric acid, blowing hydrogen chloride gas into this solution and generating nitrosyl chloride, then again blowing oxides of nitrogen into the spent liquor from the nitrosyl chloride generation step in order to reproduce a nitrosylsulphuric acid solution and in order to set up a cyclic system for preparing the nitrosyl chloride by adding to the system only the oxides of nitrogen and hydrogen chloride. In this continuous method water is produced constantly as indicated in Equation 1 and the water formed has to be converted into sulphuric acid by means of fuming sulphuric acid or sulphur trioxide and a part of the spent liquor has to be taken out of the cyclic system in order to maintain its material balance, or, alternatively, the water has to be taken out of the cyclic system by distillation of the spent liquor under reduced pressure.

While the spent liquor which has been taken out to the outside of the system by the above method can be used for other purposes as sulfuric acid by being converted thereto by the conventional nitric oxide process for sulfuric acid manufacture, the recovery of the oxides of nitrogen which are formed in this instance is a disadvantage from the commercial standpoint. Furthermore, since a small amount of hydrochloric acid is contained in the cycling spent liquor, hydrochloric acid is also contained in the sulfuric acid formed. Considerable restrictions are also imposed as to the uses to which the nitric acid formed can be employed.

On the other hand, in the latter method consisting of taking out to the outside of the cyclic system of the water produced as the by-product, although there is no need of drawing off of the cycling spent liquor to the outside of the cyclic system for maintaining the material balance thereof, it is an advantage from the operations management standpoint to draw off a part of the cycling spent liquor to the outside of the cyclic system on account of the accumulation of such as metals in the cycling spent liquor in the cyclic system.

Hence, the handling of the spent liquor taken out to the outside of the cyclic system becomes a problem from the commercial standpoint regardless of whether the former or the latter method is practiced.

We have now found a cyclic method of preparing nitrosyl chloride on a commercial scale and by means of which the spent liquor may be utilized as an acid catalyst in the Beckmann rearrangement of the hydrochloride salts of cycloalkanone oximes, obtained by the photochemical reaction of nitrosyl chloride on cycloalkanes, to the corresponding lactams of the cycloalkanes.

Accordingly, it is an object of the present invention to provide a method of preparing nitrosyl chloride whereby the preparation of nitrosyl chloride by the cyclic process can be carried into effect with advantage and effectiveness on a commercial scale, and at the same time the liquid portion of the spent liquor which increases as the cyclic reaction proceeds can be directly utilized as an acid catalyst in a related art, i.e., the Beckmann rearrangement of the hydrochloride salts of cycloalkanone oximes obtained by the photochemical reaction of cycloalkanes.

Another object of this invention is to provide a method of preparing nitrosyl chloride conveniently by effecting the generation of nitrosyl chloride in both the sulfuric acid solution of nitrosylsulfuric acid in the cyclic system for preparing nitrosyl chloride and in the liquid portion of the aforesaid spent liquor produced in increasing amounts which is taken out of said system.

Other objects and advantages of the present invention will become apparent from the description which follows:

The method of the invention comprises a method of preparing nitrosyl chloride which comprises, in combination, the following steps:

(a) reacting a mixed gas comprising nitric oxide and nitrogen peroxide with a volume of sulphuric acid thereby preparing an increased volume of solution of nitrosyl sulphuric acid in sulphuric acid;

(b) reacting the solution obtained in (a) with hydrogen chloride, thereby generating nitrosyl chloride which is separated;

(c) removing a volume of liquid from the spent liquor from step (b) substantially equal in volume to the volume of sulphuric acid initially used in step (a) and reacting this liquid in a subsequent step (a) with further nitric oxide and nitrogen peroxide to regenerate a solution of nitrosyl sulphuric acid in sulphuric acid which is recycled for a subsequent operation of step (b) above; and (d) reacting the remainder of the spent liquor from step (b) with hydrogen chloride thereby generating additional nitrosyl chloride which is separated, and continuing the treatment with hydrogen chloride until the concentration of nitrosyl sulphuric acid in the liquor is reduced to less than 3 weight percent.

The mixed gas comprising nitric oxide and nitrogen peroxide may be obtained by mixing nitric oxide (NO) and nitrogen peroxide ($NO_2$) or nitric oxide (NO) (in excess) and oxygen ($O_2$) may be mixed and used since the two react to form nitrogen peroxide. The preferred gas mixture is "nitrose gas" which is that obtained by the oxidation of ammonia with air. The presence of other oxides of nitrogen, for example nitrous oxide ($N_2O$) which do not participate in the reaction, is also permissible, and it is also possible to use the spent gases of other industries so long as they contain nitric oxide (NO) and nitrogen peroxide ($NO_2$). It is preferred that the molar ratio of nitric oxide to nitrogen peroxide in the mixed gas is about 1.1 and since excess nitrogen peroxide gives rise to the formation of nitric acid, an undesirable by-product in the sulphuric acid solution of nitrosylsulphuric acid, it is preferred that any excess of nitrogen peroxide is below that which will produce nitric acid in an amount greater than 5% by weight of the sulphuric acid solution of nitrosylsulphuric acid. The reaction of step (a) may be carried out satisfactorily at room temperature and atmospheric pressure, but it is of advantage to perform at a temperature of 30 to 50° C. as the rate of absorption of the mixed gas is enhanced. Other than that it is desirable that the water content of the sulphuric acid solution of nitrosylsulphuric acid formed in step (a) does not depart from a concentration of 2 to 13% by weight of the solution; there is no restriction as to the concentration of the sulphuric acid starting material. Normally, concentrated sulphuric acid, pure sulphuric acid, or oleum, may be used either alone or as a mixture.

The sulfuric acid solution of nitrosylsulfuric acid obtained in step (a) is normally reacted with hydrogen chloride gas in step (b) at a temperature of 50–250° C., preferably 80–200° C. The reaction time is usually on the order of 15–60 minutes. The reaction can be satisfactorily carried out by blowing hydrogen chloride gas into the foregoing solution. Although the hydrogen chloride gas may contain some water in this instance, as an increase in the water content as well as an increase in the temperature accelerates the decomposition of the nitrosylsulfuric acid and/or nitrosyl chloride, it is advisable to blow in as anhydrous a gas as possible.

It is preferred to use hydrogen chloride gas in excess amounts according to the method of the present invention, normally the use of hydrogen chloride gas in an amount on the order of 5 mols to each mol of nitrosylsulfuric acid being preferred.

Thus the spent liquor resulting from the primary generation of nitrosyl chloride by reacting the primary hydrogen chloride gas with the nitrosylsulfuric acid in step (b) is cycled and again reacted with a mixed gas comprising nitrogen monoxide and nitrogen peroxide to convert it into a sulfuric acid solution of nitroslylsulfuric acid. Prior to again reacting said mixed gas with the spent lquor in this cyclic system, it is advisable to replenish the operational loss of the sulfuric acid portion necessary for forming nitrosylsulfuric acid by adding one or more compounds selected from the group consisting of sulfuric acid, pure sulfuric acid, and fuming sulfuric acid.

The remaining volume of the spent liquor, which is passed to step (d) is an aqueous sulphuric acid solution containing 10–25% of nitrosylsulphuric acid and this spent liquor is reacted with hydrogen chloride gas to generate futher nitrosyl chloride. In carrying out this step (d), it is preferred to use a large excess of hydrogen chloride over that theoretically required to react with the nitrosylsulphuric acid in the spent liquor and then to use the mixed gas of hydrogen chloride and nitrosyl chloride as the source of hydrogen chloride in a subsequent operation of step (b). In order to reduce the concentration of nitrosylsulphuric acid in the spent liquor in this step (d), the reaction with hydrogen chloride is preferably at a temperature of 120° to 200° C.

The spent liquor which remains after step (d) has been carried out contains less than 3% by weight of nitrosylsulphuric acid and, as stated previously, this liquor may be utilized as an acid catalyst in the Beckmann rearrangement of cycloalkanone oxime hydrochlorides. When the nitrosylsulphuric acid content of a spent liquor exceeds 3% by weight, it cannot be used in the Beckmann rearrangement without causing adulteration of the lactam. The small amount, namely, less than 3% by weight, of nitrosylsulphuric acid present in the spent liquors produced by the method of the invention is able to react with the hydrogen chloride initially present in the cycloalkanone oxime salts with the production of further nitrosyl chloride which may be recovered. By this means it is possible to achieve substantially complete utilization of the nitrosyl group in the nitrosylsulphuric acid produced in step (a).

Figure 2:
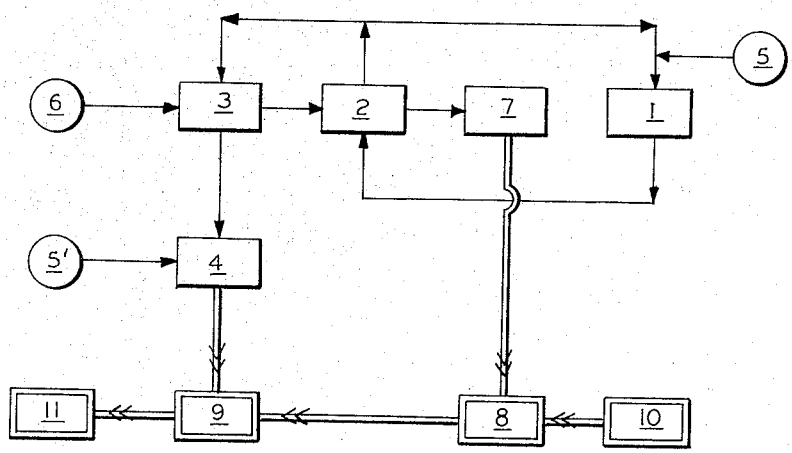

Next, an example of a combination of operational steps suitable for carrying the method of the present invention into effect will be described with reference to the accompanying drawings, in which:

FIG. 1 is a flow diagram illustrating the process for the preparation of nitrosyl chloride; and FIG. 2 is a flow diagram showing an example of a combination that is commercially advantageous, in which the process of preparing nitrosyl chloride according to the method of the present invention is combined with the method of the related art comprising the photochemical reaction of nitrosyl chloride with cycloalkanes to obtain the hydrochloride salts of cycloalkanone oximes from which the lactams corresponding to the starting material cycloalkanes are prepared by the Beckmann rearrangement of said salts.

In the figures, 1 is the nitrosulfuric acid preparation tank in which the mixed gas comprising nitrogen monoxide and nitrogen peroxide is reacted in step (a) with sulfuric acid to obtain the sulfuric acid solution of nitrosylsulfuric acid; 2 is the primary generating tank in which said solution is reacted with the primary hydrogen chloride gas in step (b) to generate nitrosyl chloride; 3 is the secondary generating tank for generating nitrosyl chloride by means of the secondary hydrogen chloride gas in step (d); 4 is the tank for the spent liquor resulting from the step (d); 5 is the supply tank for the sulfuric acid to be used for replenishing the sulfuric acid portion of the cycling spent liquor; 6 is the supply tank for hydrogen chloride gas; and 7 is the storage tank for the nitrosyl chloride which is generated in step (b). Both FIGURES 1 and 2 illustrate the instance in which the nitrosyl chloride hydrogen chloride gas generated in a step (d) and containing an excess of hydrogen chloride in a step (b). It will be apparent that changes in design may be made so that the hydrogen chloride used in steps (b) and (d) are supplied separately from different supply sources, and the resulting nitrosyl chlorides are taken out separately and then collected together. In FIGURE 2, 10 is a cycloalkane supply tank, 8 is a photochemical reaction tank for the reaction between the cycloalkane and nitrosyl chloride; 9 is a tank in which is carried out the Beckmann rearrangement reaction of the cycloalkanone oxime hydrochloride obtained as a result of the photochemical reaction, and 11 is a storage tank for the crude lactam obtained by the rearrangement. In FIGURE 2 the nitrosyl chloride from storage tank 7 is supplied to the photochemical reaction tank 8 and spent liquor remaining from step (d) of the method of the invention is supplied to the Beckmann rearrangement reaction tank 9 from tank 4. In this instance, the sulfuric acid portion may be replenished, as required, from tank 5', but an exceedingly small amount will suffice as compared with those cases not according to the method of this invention.

To illustrate the invention further, several modes of practicing the method of the invention will be described by means of the following examples. It is to be understood however that the invention is not to be limited by these examples, but is capable of modification and variation within the spirit of the invention and the scope of the appended claim.

Example 1

Following the process as illustrated in FIG. 1, the sulfuric acid solution of nitrosylsulfuric acid formed at tank 1 by blowing a nitrose gas into sulfuric acid of 20% by weight concentration at a temperature of 40° C. was introduced to the primary generation tank 2. In this instance, the foregoing solution contained 45% by weight of nitrosylsulfuric acid, and the quantity formed was 963 kg. At tank 2 the nitrosyl chloride-containing hydrogen chloride gas formed by feeding greatly in excess from tank 6 the secondary hydrogen chloride gas to the secondary generation tank 3 is blown in as the primary hydrogen chloride gas to generate in high concentration nitrosyl chloride at a temperature of 100° C.

In this manner, 83% of the spent liquor resulting from the primary generation whose concentration of nitrosylsulfuric acid has decreased to 20% by weight was cycled to tank 1, the remaining 17% being drawn off to the secondary generation system. The latter which amounted to 150 kg. was reacted with the primary hydrogen chloride gas in a greatly excessive amount of 153 kg. at a temperature of 150° C. to reduce the concentration of nitrosylsulfuric acid to less than 3% by weight. The number of moles of the secondary hydrogen chloride gas to each mole of nitrosylsulfuric acid in this reaction was 17.7 moles. On the other hand, the secondary hydrogen chloride gas became 6.2% by volume of nitrosyl chloride-containing hydrogen chloride gas, which in turn reacts as the aforesaid primary hydrogen chloride gas with a sulfuric acid solution of high concentration to form 50% by volume of nitrosyl chloride. In consequence of these reactions, the concentration of nitrosylsulfuric acid in the spent liquor resulting from this secondary generation was 1.2% by weight. By using 143 kg. of this spent liquor in tank 9 of FIG. 2 as the catalyst for the Beckmann rearrangement reaction, 98 kg. of ε-caprolactam of excellent quality was obtained.

Example 2

As the spent liquor resulting from the primary generation, which was being cyclically used, became contaminated, approximately 30 tons thereof was taken out to the outside of the system. As the quantity used of the hydrogen chloride gas in the main process was 650 kg., when this spent liquor taken out to the outside of the system was reacted at 200° C. under the condition that 19 moles of hydrogen chloride gas was used to each mole of nitrosylsulfuric acid, the concentration of the nitrosylsulfuric acid was reduced to as low as 0.8% by weight.

Thus, we were able by means of the foregoing operation to obtain a yield of 90.2% as calculated from the ammonia, which becomes the starting material for obtaining nitrogen oxide gas, to nitrosyl chloride, the intended product. On the other hand, when the reaction with a greatly excess amount of hydrogen chloride gas is not carried out, the yield falls to about 85%.

Example 3

Following the process as shown in FIG. 1, to that at tank 1 comprising 8.10 kg. of a sulfuric acid solution of nitrosyl chloride whose concentration was 31.4% to which had been added 1,814 kg. of an 11.2% fuming sulfuric acid fed from tank 5 was blown in nitrose gas at a temperature of 50° C., after which the sulfuric acid solution of nitrosylsulfuric acid which was formed was introduced to the primary generation tank 2. In this instance, the quantity of the above solution introduced was 10,410 kg. and it contained therein 42.8% of nitrosylsulfuric acid. At tank 2, hydrogen chloride gas containing 14 mole percent of nitrosyl chloride generated by feeding greatly in excess a secondary hydrogen chloride gas to the secondary generation tank 3 was blown in as the primary hydrogen chloride gas thereby generating at a temperature of 120° C. hydrogen chloride gas containing 43 mole percent of nitrosyl chloride. The quantity of gas generated was 785 Nm.$^3$. Thus, 80% of the spent liquor resulting from the primary generation whose concentration as nitrosylsulfuric acid had declined to 31.4% was cycled to tank 1, and the remaining 20% was drawn off to the secondary generation system. The latter amounted to 2,033 kg. which was then reacted with a great excess of a secondary hydrogen chloride gas amounting to 785 Nm.$^3$ at a temperature of 170° C. whereby the concentration of the nitrosylsulfuric acid was reduced to 0.7% by weight. On the other hand, the secondary hydrogen chloride gas becomes a hydrogen chloride gas containing 14 mole percent of nitrosyl chloride, and this is then, as the aforesaid primary hydrogen gas, reacted with a sulfuric acid solution of nitrosylsulfuric acid of high concentration to give 42.8 mole percent of nitrosyl chloride. The concentration of nitrosylsulfuric acid in the so obtained spent liquor resulting from the secondary generation was 0.7% by weight. When to 1,981 kg. of this spent liquor was added 2,670 kg. of 12% fuming sulfuric acid from tank 5 and this was used as the catalyst in the Beckmann rearrangement reaction, 2,710 kg. of crude lactam was obtained. And from this was obtained ε-caprolactam of good quality.

Example 4

In accordance with the process as illustrated in FIG. 1, 8.2 kg. of sulfuric anhydride from tank 5 was added to tank 1 containing 94.5 kg. of a sulfuric acid solution of nitrosylsulfuric acid whose concentration was 23.8% by weight. A mixed nitrogen monoxide-nitrogen peroxide gas was blown into this at a temperature of 48° C. and a sulfuric acid solution of nitrosylsulfuric acid was formed which was then introduced into tank 2. In this instance, the quantity introduced of the foregoing solution was 10,410 kg. and it contained 32.9% by weight of nitrosylsulfuric acid. Into this tank was blown in as the primary hydrogen chloride gas a nitrosyl chloride-containing hydrogen chloride gas which had been formed by feeding greatly in excess from tank 6 into the secondary generation tank 3 a secondary hydrogen chloride gas. Thus, 90% of spent liquor resulting from the primary generation whose concentration of nitrosylsulfuric acid had fallen to 23.8% by weight was cycled to tank 1 and the remaining 10% was drawn off to the secondary generation system. With this, which amounted to 10.5 kg. was reacted at a temperature of 120° C. a great excess of a secondary hydrogen chloride gas amounting to 7.3 kg. to reduce the concentration of nitrosylsulfuric acid to less than 3% by weight. In this reaction, the number of moles of the secondary hydrogen chloride gas becomes 9.25% by volume of nitrosyl chloride-containing hydrogen chloride, which, as described before, reacts with the sulfuric acid solution of nitrosylsulfuric acid as the primary hydrogen chloride gas and becomes 50% by volume of nitrosyl chloride. The concentration of nitrosylsulfuric acid in the so obtained spent liquor resulting from the secondary generation was 2% by weight. Ten kg. of this spent liquor was employed as a catalyst in tank 9 in the Beckmann rearrangement reaction of a hydrochloride salt of cyclohexanone oxime formed in the photochemical reaction tank shown in FIG. 2 and containing 56% by weight of cyclohexanone oxime, and by effecting the reaction at 110° C. a sulfuric acid solution of ε-caprolactam was obtained. After neutralizing this solution, it was vacuum distilled whereby was obtained 5.7 kg. of ε-caprolactam whose quality in PMU was above 200 seconds.

What is claimed is:

A method of preparing nitrosyl chloride and a by-product spent liquor suitable for use in the Beckmann rearrangement of the hydrochloride salt of cycloalkanone oximes obtained by photochemically reacting nitrosyl chloride with cycloalkanes which comprises, in combination, the following steps:

(a) reacting a mixed gas comprising nitric oxide and nitrogen peroxide with a volume of sulphuric acid thereby preparing an increased volume of solution of nitrosyl sulphuric acid in sulphuric acid;

(b) reacting the solution obtained in (a) with hydrogen chloride, thereby generating nitrosyl chloride which is separated;

(c) removing a volume of liquid from the spent liquor from step (b) substantially equal in volume to the volume of sulphuric acid initially used in step (a) and reacting this liquid in a subsequent step (a) with further nitric oxide and nitrogen peroxide to regenerate a solution of nitrosyl sulphuric acid in sulphuric acid which is recycled for a subsequent operation of step (b) above; and (d) reacting the remainder of the spent liquor from step (b) with hydrogen chloride, thereby generating additional nitrosyl chloride which is separated, and continuing the treatment with hydrogen chloride until the concentration of nitrosyl sulphuric acid in the liquor is reduced to less than 3 weight percent; and thereafter directly employing the spent liquor whose nitrosyl sulphuric acid content has thus become less than 3% by weight in the process of the Beckmann rearrangement of the hydrochloride salt of cycloalkanone oxime obtained by photochemically reacting the nitrosyl chloride obtained in steps (a) through (d) with a cycloalkane.

References Cited

UNITED STATES PATENTS

| | | | |
|---|---|---|---|
| 1,930,664 | 10/1933 | Rosenstein | 23—203 X |
| 2,087,278 | 7/1937 | Crittenden | 23—157 |
| 2,123,072 | 5/1938 | Beekhuis | 23—157 X |
| 3,060,173 | 10/1962 | Schickh et al. | 260—239.3 |
| 3,090,739 | 5/1963 | Ito | 260—239.3 X |

JOHN D. RANDOLPH, *Primary Examiner.*

M. A. BRINDISI, WALTER A. MODANCE,
*Examiners.*

B. H. LEVENSON, ROBERT T. BOND,
*Assistant Examiners.*